(12) United States Patent
Ruscak

(10) Patent No.: US 8,016,684 B2
(45) Date of Patent: Sep. 13, 2011

(54) CENTRIFUGAL ADVANCE MECHANISM

(75) Inventor: Ian M. Ruscak, Westerville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 369 days.

(21) Appl. No.: 12/181,466

(22) Filed: Jul. 29, 2008

(65) Prior Publication Data

US 2010/0025138 A1 Feb. 4, 2010

(51) Int. Cl.
*F16D 3/10* (2006.01)

(52) U.S. Cl. .......... 464/1; 74/64; 192/56.57; 192/105 B; 464/161; 464/167

(58) Field of Classification Search .............. 192/105 B, 192/103 A, 56.57; 74/434, 568 R, 64; 123/90.15, 123/90.17, 90.18; 464/1, 6, 160, 161, 169, 464/167
See application file for complete search history.

(56) References Cited

U.S. PATENT DOCUMENTS

| | | | |
|---|---|---|---|
| 1,029,026 A * | 6/1912 | Newman | 464/1 |
| 1,047,841 A | 12/1912 | Ruthardt | |
| 1,235,130 A * | 7/1917 | Fuchs | 464/1 |
| 2,060,580 A | 11/1936 | LaChapelle | |
| 2,493,232 A * | 1/1950 | Dodge | 192/104 C |
| 3,243,024 A * | 3/1966 | Schwab | 192/56.57 |
| 3,262,435 A | 7/1966 | Cribbs | |
| 3,301,010 A | 1/1967 | Vernick | |
| 3,305,058 A * | 2/1967 | Orwin et al. | 192/56.57 |
| 4,131,096 A | 12/1978 | Mitchell | |
| 4,302,985 A | 12/1981 | Natkin | |
| 4,317,511 A * | 3/1982 | Asai | 192/56.57 |
| 4,421,074 A | 12/1983 | Garcea et al. | |
| 4,545,338 A | 10/1985 | Allred, III | |
| 4,747,375 A | 5/1988 | Williams | |
| 4,889,086 A | 12/1989 | Scapecchi et al. | |
| 4,955,330 A | 9/1990 | Fabi et al. | |
| 5,163,872 A | 11/1992 | Niemiec et al. | |
| 5,609,127 A | 3/1997 | Noplis | |
| 6,289,860 B1 | 9/2001 | Speckhart et al. | |
| 6,805,082 B2 * | 10/2004 | Takenaka et al. | 123/90.17 |
| 7,228,829 B1 | 6/2007 | Louie | |
| 7,682,255 B2 * | 3/2010 | Monis et al. | 464/161 |

* cited by examiner

*Primary Examiner* — Anne Marie Boehler
(74) *Attorney, Agent, or Firm* — Ulmer & Berne LLP

(57) ABSTRACT

A centrifugal advance mechanism has drive and driven members connected with one another to rotate about a common axis as they move toward and away from each other along the common axis. A resilient element biases the members toward each other. A ramp on one of the members has an inner end portion and an outer end portion. The inner end portion is closer to the common axis than the outer end portion, the ramp rising as it moves from the inner end portion toward the outer end portion. A ball contacts the ramp and the other member. The resilient element biases the ball down the ramp, the ball traveling radially outward and up the ramp as the members rotate at increasing angular velocity thereby causing the members to separate from each other against the bias of the resilient element and to rotate with respect to each other.

19 Claims, 4 Drawing Sheets

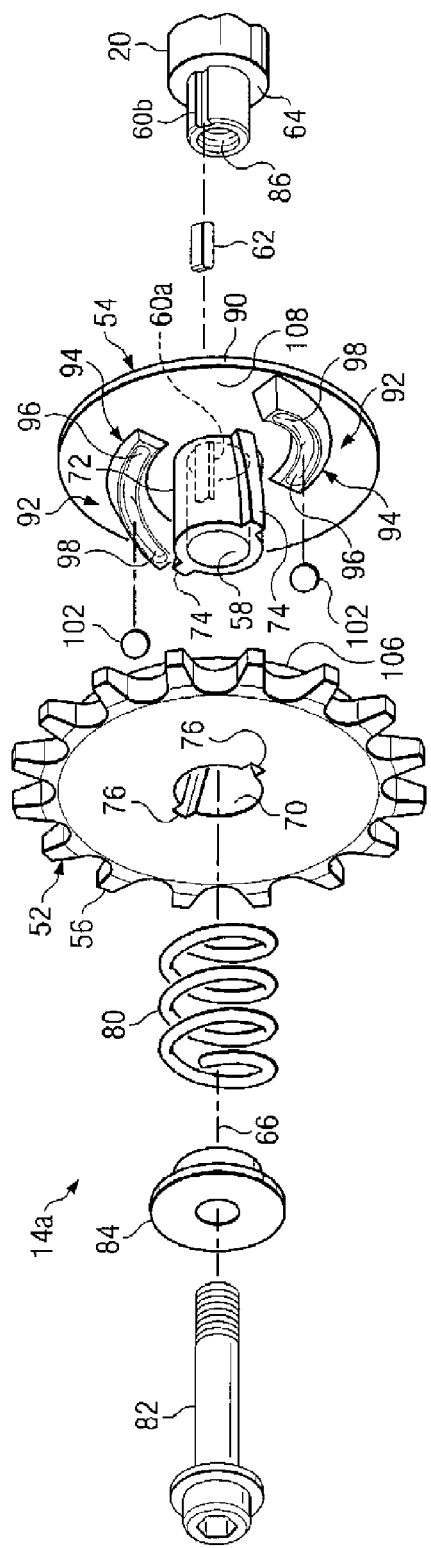
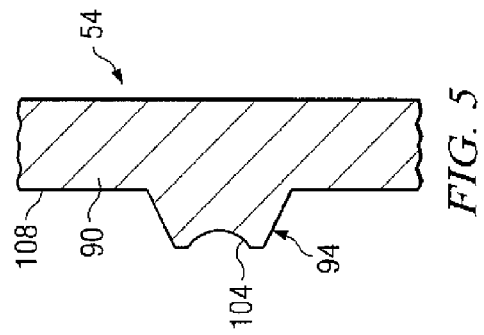
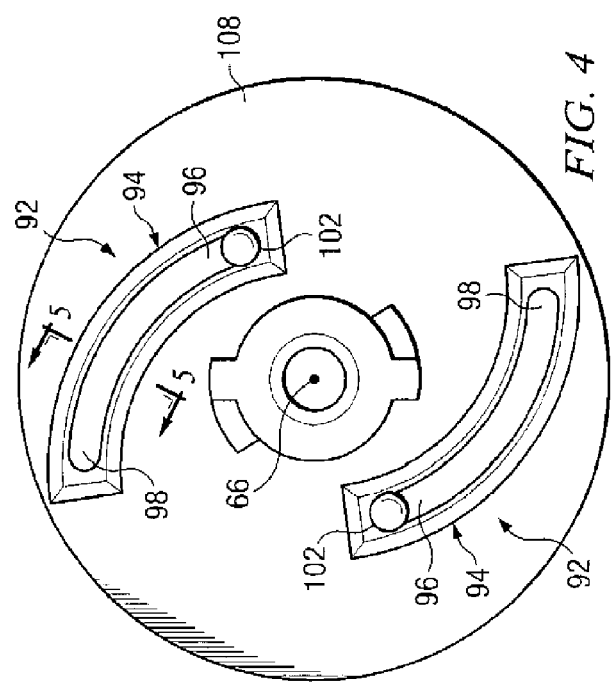
FIG. 3
FIG. 5
FIG. 4

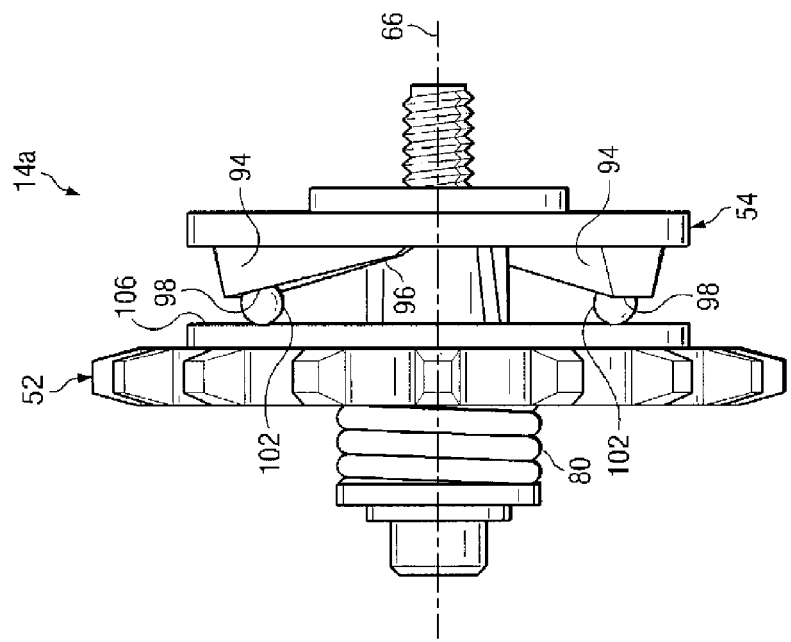
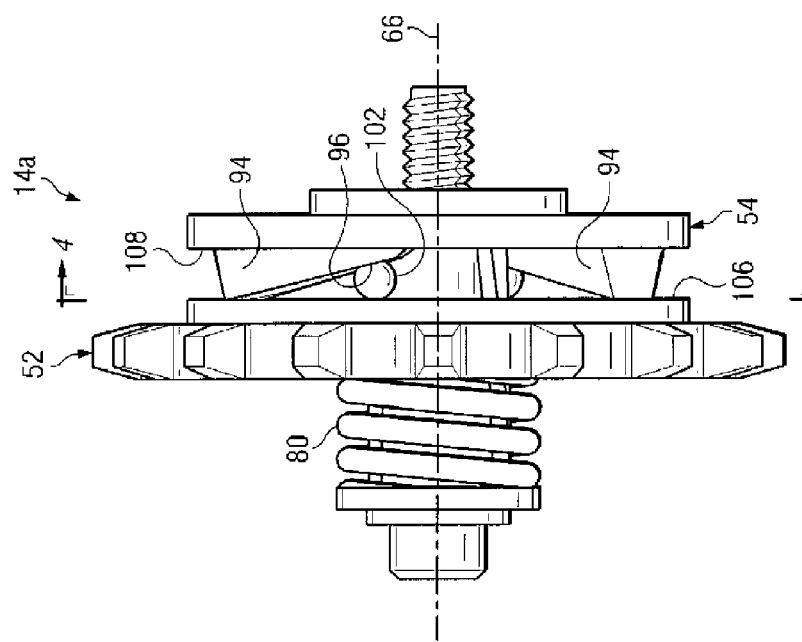

CENTRIFUGAL ADVANCE MECHANISM

TECHNICAL FIELD

The invention relates generally to a centrifugal advance mechanism to vary the timing of operations as a function of an engine's crankshaft speed, and more generally to a centrifugal advance mechanism to change the angular relationship between two rotating members as a function of the speed of rotation.

BACKGROUND

Operation of an internal combustion engine depends on proper timing of various events such as firing of spark plug(s) and opening and closing of various valves including intake and exhaust valves. The proper moment in the operating cycle of the engine for these events depends in part on the engine's speed. Proper timing can affect engine performance, and in certain prior art engines, mechanisms have been provided to vary the angular relationship between components that are rotating at various speeds.

SUMMARY

A centrifugal advance mechanism is provided that includes a drive member and a driven member that are connected with one another to rotate about a common axis as they move toward and away from each other along the common axis. A resilient element is mounted to bias the members toward each other. One of the drive and driven members has a ramp that has an inner end portion and an outer end portion, the inner end portion being closer to the common axis than the outer end portion, and the ramp rises as it moves from the inner end portion to the outer end portion. A ball is in contact with the ramp and the other of the drive and driven members. The resilient element biases the ball down the ramp. As the drive and driven members rotate about the common axis at increasing angular velocity, the ball travels radially outward, and so up the ramp. Movement of the ball up the ramp causes the drive and driven members to separate from each other against the bias of the resilient element and to rotate with respect to each other.

An internal combustion engine is provided that includes a crankshaft, a camshaft and a centrifugal advance mechanism. The centrifugal advance mechanism is connected to one of the crankshaft and camshaft. The centrifugal advance mechanism comprises a drive member and a driven member which are connected with one another to rotate about a common axis as they move toward and away from each other along the common axis. A resilient element is mounted to bias the drive member and driven members toward each other, and one of the drive and driven members has a ramp. The ramp has an inner end portion and an outer end portion, the inner end portion being closer to the common axis than the outer end portion. The ramp rises as it moves from the inner end portion toward the outer end portion. A ball is in contact with the ramp and the other of the drive and driven members, and the resilient element biases the ball down the ramp. The ball travels radially outward and up the ramp as the drive and driven members rotate about the common axis at increasing angular velocity thereby causing the drive and driven members to separate from each other against the bias of the resilient element and to rotate with respect to each other.

A motor vehicle is provided that includes an internal combustion engine. The engine includes a crankshaft, a camshaft and a centrifugal advance mechanism. The centrifugal advance mechanism is connected to one of the crankshaft and camshaft. The centrifugal advance mechanism includes a drive member and a driven member which are connected with one another to rotate about a common axis as they move toward and away from each other along the common axis. A resilient element is mounted to bias the drive and driven members toward each other, and one of the drive and driven members has a ramp. The ramp has an inner end portion and an outer end portion, the inner end portion being closer to the common axis than the outer end portion. The ramp rises as it moves from the inner end portion toward the outer end portion. A ball is in contact with the ramp and the other of the drive and driven members, and the resilient element biases the ball down the ramp. The ball travels radially outward and up the ramp as the drive and driven members rotate about the common axis at increasing angular velocity thereby causing the drive and driven members to separate from each other against the bias of the resilient element and to rotate with respect to each other.

BRIEF DESCRIPTION OF THE DRAWINGS

Various embodiments according to the inventive principles will become better understood with regard to the following description, appended claims and accompanying drawings wherein;

FIG. 3 is an exploded, perspective view of the components of one of the centrifugal advance mechanisms shown in FIG. 2;

FIG. 4 is a view looking in the direction of arrows 4-4 of FIG. 6;

FIG. 5 is a partial cross-sectional view looking in the direction of arrows 5-5 in FIG. 4:

FIG. 6 is a side elevation view of the centrifugal advance mechanism shown in FIGS. 3-5, with the centrifugal advance mechanism shown in a configuration representing rotation at a relatively low speed; and FIG. 7 is a view similar to FIG. 6, but with the centrifugal advance mechanism shown in a configuration corresponding to a relatively higher speed.

DETAILED DESCRIPTION

Figure 1:
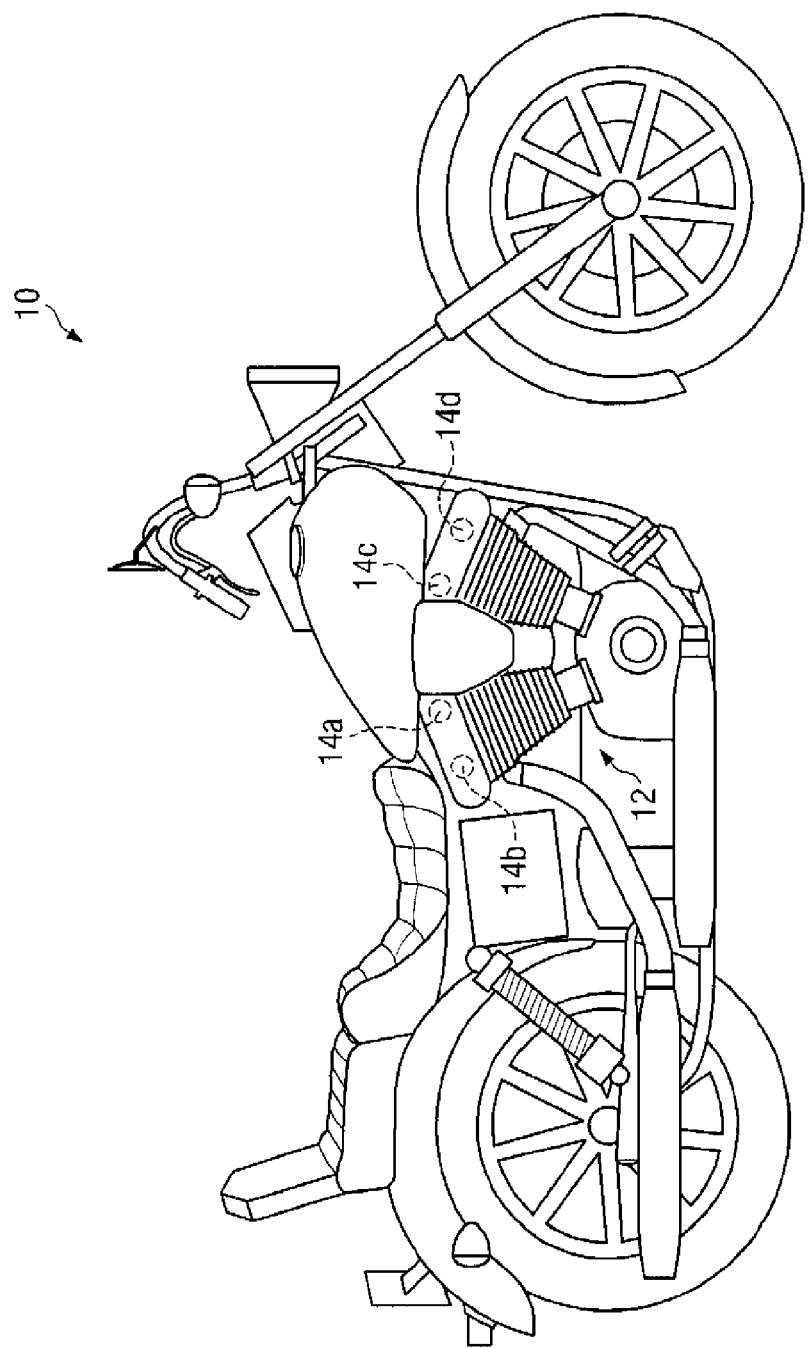
FIG. 1 is a side elevation view of a motorcycle having an engine incorporating multiple centrifugal advance mechanism.

The motorcycle 10 shown in FIG. 1 has an internal combustion engine 12. The engine, 12, a V-twin, has four overhead camshafts, one operating an intake valve and one operating an exhaust valve for each cylinder. Each camshaft can be driven through a centrifugal advance mechanism 14a, 14b, 14c, and 14d, respectively.

Figure 2:
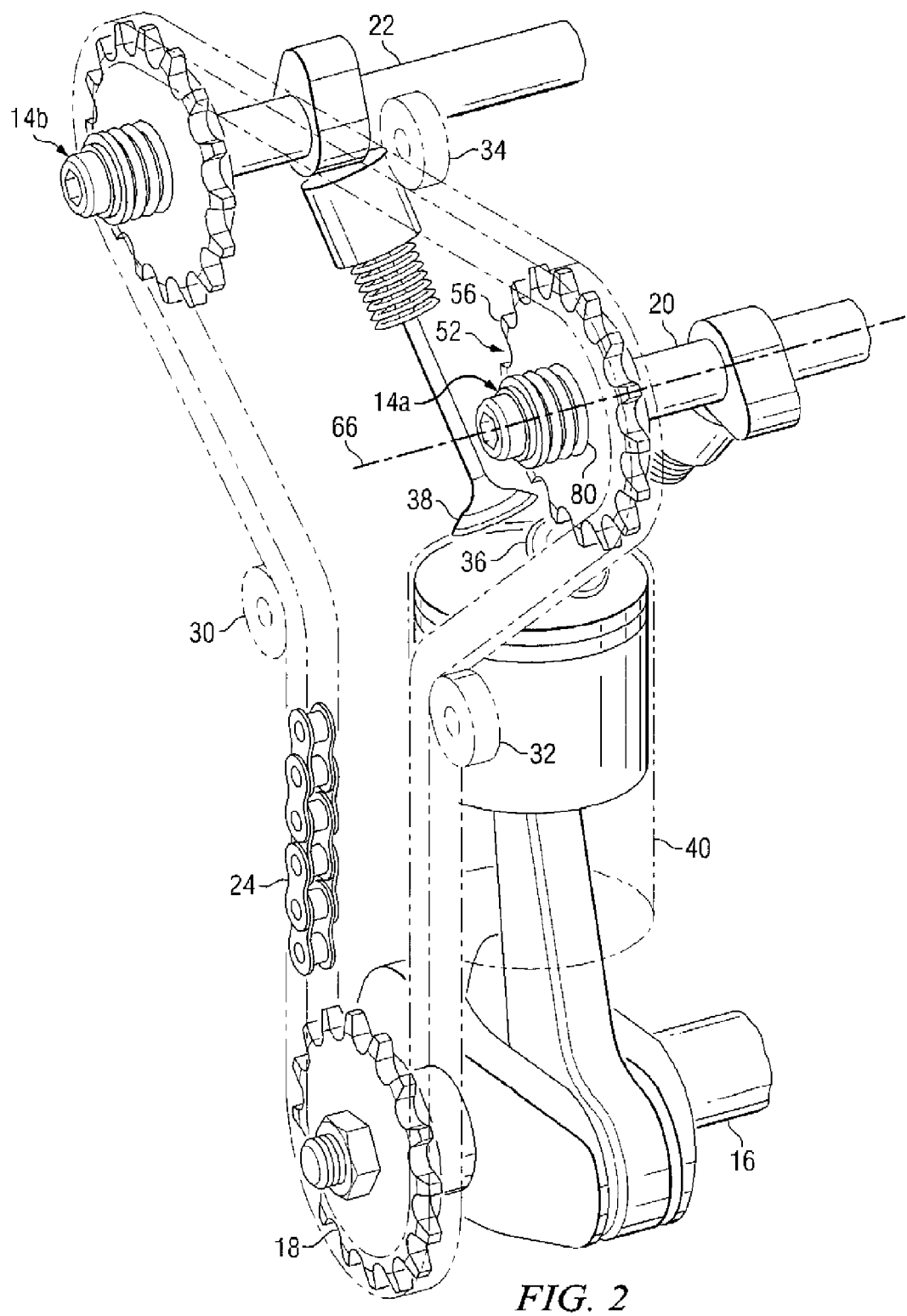
FIG. 2 is a perspective view of a portion of the engine of FIG. 1 showing a pair of centrifugal advance mechanisms.

Some components of the engine 12 are shown in FIG. 2. Crankshaft 18 can be connected to a sprocket 18. The sprocket 18 rotates with the crankshaft 16 and drives intake and exhaust camshafts 20 and 22, respectively, through a timing chain 24 and centrifugal advance mechanisms 14a and 14b which are connected to the camshafts 20 and 22, respectively. Tensioning and idler pulleys 30, 32, and 34 may be used to maintain the timing chain 24 at the proper tension and to guide it. As the camshafts 20 and 22 rotate, they open and close intake and exhaust valves 38 and 38, respectively, in sequence to admit fresh air/fuel mixture to the cylinder 40 and to exhaust fumes from the cylinder 40 in a well-known manner. As will be appreciated by those skilled in the art, other means for driving the camshafts 20 and 22 are possible, including the use of a toothed belt engaging toothed pulleys, as well as the use of various gear trains, it will also be appreciated that multiple valves can be associated: with each camshaft, including multiple valves in each cylinder as well as the valves of multiple cylinders. Further, it will be appreciated that both the intake and exhaust valves of the engine could be actuated by a single camshaft. The centrifugal advance mechanisms 14a and 14b may be used to advantage in engines having any of these configurations, or others.

The centrifugal advance mechanisms 14a and 14b are shown to be driven by the timing chain 24 and can vary the timing of valve opening and closing as a function of engine speed. This variation in valve timing can permit tuning of the engine to vary according to the dynamic properties of the air/fuel mixture being drawn into the cylinder 40 and of the exhaust gases being pushed out of the cylinder 40. At idle, one valve timing might be appropriate, and as engine speed increases, different valve timings might be better. The centrifugal advance mechanisms 14a and 14b make it possible to achieve the desired valve liming as the engine-speed changes.

The centrifugal advance mechanisms 14a, 14b, 14c, and 14d are generally similar (though, as discussed below, they need not be Identical), and only one (14a) will be described in detail, it being understood that the description can apply equally to the other centrifugal advance mechanisms 14b, 14c, and 14d connected to the other camshafts.

The centrifugal advance mechanism 14a (FIG. 3) includes a drive member 52 and a driven member 54. The drive member 52 can be formed as a unitary component with teeth 56 which engage the timing chain 24. If applied to a different internal combustion engine, the teeth 58 on the drive member 52 of the centrifugal advance mechanism 14a may take a different form such as teeth to engage a gear or a toothed belt. Alternatively, teeth or alternative elements can be provided that are formed as a separate part that is bolted to or connected to a drive member.

The driven member 54 is connected to the camshaft 20 so that the driven member 54 rotates together with the camshaft 20. This may be achieved in any known manner. For example, the driven member 54 may have a centrally located cylindrical bore 53 that fits over the camshaft 20, and both the bore 58 and camshaft 20 can have respective keyways 60a and 60b, milled into them. A key 62 can be inserted into the keyways 60a and 60b to ensure that the driven member 54 and the camshaft 20 rotate together.

The camshaft 20 can also include a shoulder 64 that limits axial movement of the driven member 54 onto the camshaft 20. Thus, when the driven member 54 is seated against the shoulder 64 and the key 62 is in place, axial and rotary movement of the driven member 54 with respect to the camshaft 20 is prevented.

The drive member 52 and driven member 54 are mounted to rotate about a common axis, specifically, the axis of rotation 68 of camshaft 20. To this end, the drive member 52 can have a centrally located cylindrical bore 70. The driven member 54 can include a cylindrical hub 72 that fits in the bore 70 of the drive member 52. The cooperating bore 70 and hub 72 allow the drive and driven members 52 and 54 to rotate about the axis 66 of the camshaft 20 and to move axially with respect to each other.

The relative rotary and axial movement between the drive and driven members 52 and 54 can be governed in part by a helical spline arrangement. The hub 72 of the driven member 54 can include raised helical teeth 74, and the bore 70 in the drive member 52 can have a pair of corresponding helical grooves 76. As a result of the teeth 74 and grooves 76, whenever the drive and driven members 52 and 54 separate axially, they must also rotate with respect to one another about the common axis 68. Controlling this relative rotation between the drive and driven members 52 and 54 as a function of the rotational speed is what advances or retards the operation of the camshaft 20 with respect to the crankshaft 16. Although shown with a pair of helical teeth 74 and grooves 76, fewer or more teeth and grooves are possible. Any other arrangement to convert relative axial movement between the drive and driven members 52 and 54 into relative rotary motion can be used, and one such alternative arrangement is described further below.

A resilient element 80 can be used to bias the drive member 52 toward the driven member 54. The resilient element 80 can be a coil spring as shown. Alternatively, it could be one or more. Belleville washers or any other device capable of applying an axial preload. The resilient element 80 can be pressed against the drive member 52 by a bolt 82 and washer 84. The bolt 82 can be threaded into a threaded bore 86 in the camshaft 20.

The driven member 54 can include a plate 90 that is connected to the hub 72. The plate 90 and hub 72 can be formed in a unitary fashion, or they can be separate components. If separate from the hub 72, the plate 90 can be securely fastened to the hub 72 so that they rotate together.

The plate 90 can carry a pair of ball and ramp arrangements 92 that, together with the resilient element 80, control the axial position of the drive member 52 with respect to the driven member 54. The ball and ramp arrangements 92 can be manufactured to be substantially identical to one another (as shown in FIGS. 3-4) in order to keep the forces generated between them and by them as symmetrical as possible. The ball and ramp arrangement 92 includes a ramp 94 (see FIGS. 3 and 4) that has an Inner end portion 98 and an outer end portion 98. The inner end portion 96 is relatively radially closer to the axis of rotation 68 of the camshaft 20 than the outer end portion 98, and the ramp 94 rises axially toward the drive member 52 with the outer end portion 98 being closer to the drive member 52 than the inner end portion 86.

The ball and ramp arrangement 92 also includes a ball 102. The ball 102 moves along the ramp 94. In order to guide the ball 102, the wall 104 of the ramp 94 may be curved or semicircular in cross-section as shown in FIG. 5. With this arrangement, and the ball 102 starting at the inner end portion 98 of the ramp 94 (see FIG. 8), centrifugal forces generated as the drive and driven members 52 and 54 rotate about the axis 86 of the camshaft 20 tend to force the ball 102 outward and up the ramp 94 toward the outer end portion 93 of the ramp as shown in FIG. 7.

The drive member 52 can have a generally flat bearing surface 106 that faces the driven member 54. The ball 102 is trapped between the wail 104 of the ramp 94 and the bearing surface 106 by the action of the resilient element 80 which biases the drive member 52 and hence the bearing surface 106 toward the driven member 54. The force of the bearing surface 108 against the ball 102 tends to force the ball 102 down the ramp 94 and toward the inner end portion 96 of the ramp 94. As the drive and driven members 52 and 54 rotate at increasing speeds, the ball 102 moves outward and up the ramp 94, separating the drive and driven members 52 and 54 against the bias of the resilient element 80. Separation of the drive and driven members 52 and 54 is accompanied by relative rotation between them by virtue of the helical teeth and grooves 74 and 76.

The force exerted by the resilient element 80 can be proportional to the extent to which it is compressed. However, a suitable resilient element alternatively may exhibit a progressive spring rate or characteristic. As the drive and driven members 52 and 54 rotate faster and faster, the Inertia of the ball 102 causes the ball to move outward and also up the ramp 94. The spring rate of the resilient element 80 and the mass of the ball 102 are selected so that the ball 102 travels the length of the ramp 94 as the rotational speed of the drive and driven members 52 and 54 changes over a selected range of speeds of rotation of the drive and driven members 52 and 54. For any given rotational speed within the selected range, an equilibrium will be reached between the inertial forces tending to move the ball 102 outward (and so up the ramp 94) and the force of the resilient element 80 tending to push the drive and driven members 52 and 54 toward each other.

While two balls 102 and two ramps 94 are shown in FIG. 4, a single ball and ramp or three or more balls and ramps could be used. In addition, although the ramps 94 are shown as rising from a generally flat surface 108 (see FIG. 3) of the driven member 54, they could be constructed so that the Inner end portion 96 of each ramp 94 is recessed below the surface 108 of the driven member 54 and so that the outer end portion 98 of the ramp 94 is flush with or above the surface 108 of the driven member 54. Moreover, which one of the drive and driven members 52 and 54 carries the ramps 94 is a matter of design choice. The ramps 94 could as easily be part of the drive member 52 as the driven member 54, part of the ramp could be formed in one of the drive and driven members 52 and 54 and another part of the ramp in the other.

The profile of the ramp 94 and the path it follows between the inner end portion 96 and the outer end portion 98 is a matter of design choice. In addition, by changing the rate at which the ramp 94 moves toward the bearing surface 106 as a function of the radial position of the ramp 94, different rates of relative rotation between the drive and driven members 52 and 54 can be achieved.

In the helical tooth and groove connection 74, 78, the raised tooth 74 can be replaced by a cylindrical pin (not shown). If this is done, then the groove 76 need not be a uniformly angled helix. Instead the groove 78 could have one part with one helix angle and another part with a different helix angle, or any shape to achieve a desired relationship between axial and rotary position for the drive and driven members 52 and 54. This, alone or together with variations in the ramp 94 as discussed above, can establish the relative rotation between the drive and driven members 52 and 54 as a function of speed (the "advance curve") and therefore can establish the amount of advance or retardation between the camshaft 20 with respect to the crankshaft 18 as a function of crankshaft speed.

As mentioned above, the centrifugal advance mechanisms 14a and 14b (FIG. 2) need not be identical. They may achieve the same advance curve or they may achieve slightly different advance curves depending upon the desired operation of the engine 12. In addition, if the same advance curves are desired for both intake and exhaust camshafts 20 and 22, then an advance mechanism 14 could be mounted to the crankshaft 18 in addition to, or in lieu of, mounting individual centrifugal advance mechanisms 14 to each camshaft. For example, the sprocket 18 on the crankshaft 16 can be replaced by a centrifugal advance mechanism like the mechanism 14a.

The centrifugal advance mechanisms 14 a - d are shown as being part of a motorcycle engine 12 (FIG. 1). Such centrifugal advance mechanisms are also suitable for use in other vehicle engines such as car and truck engines. They can also find utility in stationary engines, and can be used to control the advance of components other than camshafts. They could, for example, be used to control ignition timing and/or the timing of fuel injectors in a diesel engine. They could be used in any other application where it is desirable to adjust the angular relationship between two rotating shafts as a function of speed. However, because of the simplicity of the advance mechanisms 14, their relative light weight, and other properties, their use in motorcycle and other relatively small displacement internal combustion engines may be beneficial.

While the inventive principles have been illustrated by the description of various embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus, methods and examples shown and described. Accordingly, departures may be made from such details without departing from the scope or spirit of the general inventive principles.

What is claimed is:

1. A centrifugal advance mechanism comprising:
   a drive member and a driven member, the members being connected with one another to rotate about a common axis as they move toward and away from each other along the common axis;
   a resilient element mounted to bias the drive and driven members toward each other;
   one of the drive and driven members comprising a ramp, the ramp having an inner end portion and an outer end portion, the inner end portion being closer to the common axis than the outer end portion, the ramp rising axially toward the other of the drive and driven members as the ramp moves from the inner end portion toward the outer end portion; and
   a ball in contact with the ramp and the other of the drive and driven members,
   the resilient element biasing the ball down the ramp, the ball traveling radially outward and up the ramp as the drive and driven members rotate about the common axis at increasing angular velocity thereby causing the drive and driven members to separate from each other against the bias of the resilient element and to rotate with respect to each other.

2. The centrifugal advance mechanism of claim 1 wherein the one of the drive and driven members further comprises a second ramp, the second ramp having an inner end portion and an outer end portion, the inner end portion being closer to the axis of rotation than the outer end portion, the ramp rising axially toward the other of the drive and driven members as the ramp moves from the inner end portion toward the outer end portion, and wherein the centrifugal advance mechanism further comprises a second ball in contact with the second ramp.

3. The centrifugal advance mechanism of claim 2, wherein:
   the one of the drive and driven members further comprises a generally flat surface; and
   the ramp and the second ramp each rise from the generally flat surface.

4. The centrifugal advance mechanism of claim 3, wherein:
   the drive member has a centrally located bore, the bore having a pair of helical groves; and
   the driven member further comprises a cylindrical hub disposed within the bore, the bore comprising a pair of raised helical teeth, each of the helical teeth being engaged with a respective one of the helical grooves such that whenever the drive and driven members separate axially, the drive and driven members rotate with respect to one another about the common axis.

5. The centrifugal advance mechanism of claim 4, wherein:
each of the ramp and the second ramp comprises a respective wall, the wall of the ramp and the wall of the second ramp each being curved in cross-section.

6. The centrifugal advance mechanism of claim 5, wherein:
the driven member further comprises a plate; and
the plate comprises the generally flat surface.

7. The centrifugal advance mechanism of claim 6, wherein:
the plate and the hub of the driven member are formed as a unitary component.

8. The centrifugal advance mechanism of claim 7, wherein:
the cylindrical hub of the driven member has a keyway formed therein, the keyway being configured to receive a key for rotatably coupling the driven member to a camshaft of an internal combustion engine.

9. The centrifugal advance mechanism of claim 1 wherein the ramp is connected with the driven member.

10. The centrifugal advance mechanism of claim 1 wherein the ramp comprises a wall that guides the ball.

11. The centrifugal advance mechanism of claim 1 wherein the resilient element comprises a spring.

12. The centrifugal advance mechanism of claim 11 wherein the spring comprises a coil spring.

13. The centrifugal advance mechanism of claim 1 wherein the drive member comprises teeth for engaging a drive chain.

14. The centrifugal advance mechanism of claim 1, wherein:
the one of the drive and driven members further comprises a generally flat surface; and
the ramp rises from the generally flat surface.

15. The centrifugal advance mechanism of claim 14, wherein:
the drive member has a centrally located bore, the bore having a pair of helical groves; and
the driven member further comprises a cylindrical hub disposed within the bore, the bore comprising a pair of raised helical teeth, each of the helical teeth being engaged with a respective one of the helical grooves such that whenever the drive and driven members separate axially, the drive and driven members rotate with respect to one another about the common axis.

16. The centrifugal advance mechanism of claim 15, wherein:
the ramp comprises a wall that guides the ball; and
the wall is curved in cross-section.

17. The centrifugal advance mechanism of claim 16, wherein:
the driven member further comprises a plate; and
the plate comprises the generally flat surface.

18. The centrifugal advance mechanism of claim 17, wherein:
the plate and the hub of the driven member are formed as a unitary component.

19. The centrifugal advance mechanism of claim 18, wherein:
the cylindrical hub of the driven member has a keyway formed therein, the keyway being configured to receive a key for rotatably coupling the driven member to a camshaft of an internal combustion engine.

* * * * *

UNITED STATES PATENT AND TRADEMARK OFFICE
CERTIFICATE OF CORRECTION

| | | |
|---|---|---|
| PATENT NO. | : 8,016,684 B2 | Page 1 of 2 |
| APPLICATION NO. | : 12/181466 | |
| DATED | : September 13, 2011 | |
| INVENTOR(S) | : Ian M. Ruscak | |

It is certified that error appears in the above-identified patent and that said Letters Patent is hereby corrected as shown below:

Title Page, Item (57) Abstract, line 9, change "ba1l" to -- ball --.
Column 2, line 26, change "wherein;" to -- wherein: --;
Column 2, line 31, change "mechanisms:" to -- mechanisms; --;
Column 2, line 38, change "FIG. 4:" to -- FIG. 4; --;
Column 2, line 50, change "engine," to -- engine --;
Column 2, line 56, change "Crankshaft 18" to -- Crankshaft 16 --;
Column 2, line 64, change "valves 38" to -- valves 36 --;
Column 3, line 3, change "trains, it" to -- trains. It --;
Column 3, line 4, change "associated:" to -- associated --;
Column 3, line 21, change "liming as the engine-speed" to -- timing as the engine speed --;
Column 3, line 24, change "Identical" to -- identical --;
Column 3, line 32, change "teeth 58" to -- teeth 56 --;
Column 3, line 42, change "bore 53" to -- bore 58 --;
Column 3, line 55, change "68" to -- 66 --;
Column 4, line 3, change "68" to -- 66 --;
Column 4, line 16, change "more." to -- more --;
Column 4, line 34, change "Inner end portion 98" to -- inner end portion 96 --;
Column 4, line 36, change "68" to -- 66 --;
Column 4, line 39, change "86" to -- 96 --;
Column 4, line 45, change "98 of the ramp 94 (see FIG. 8)" to -- 96 of the ramp 94 (see FIG. 6) --;
Column 4, line 47, change "86" to -- 66 --;
Column 4, line 48, change "93" to -- 98 --;
Column 4, line 52, change "wail" to -- wall --;
Column 4, line 56, change "108" to --106 --;
Column 5, line 2, change "Inertia" to -- inertia --;
Column 5, line 18, change "Inner" to -- inner --;
Column 5, line 35, change "78," to -- 76, --;
Column 5, line 38, change "78" to -- 76 --;
Column 5, line 47, change "18" to --16 --; and Signed and Sealed this
Twenty-eighth Day of February, 2012

David J. Kappos
*Director of the United States Patent and Trademark Office*

Column 5, line 54, change "18" to --16 --.